(12) United States Patent
Chalich

(10) Patent No.: US 6,234,198 B1
(45) Date of Patent: May 22, 2001

(54) AIR VENT VALVE

(76) Inventor: Daniel Chalich, 14378 86th Ave. N., Seminole, FL (US) 33776

( * ) Notice: Subject to any disclaimer, the term of this patent is extended or adjusted under 35 U.S.C. 154(b) by 0 days.

(21) Appl. No.: 09/558,847

(22) Filed: Apr. 27, 2000

(51) Int. Cl.[7] .................................................. F16K 15/04
(52) U.S. Cl. ................ 137/526; 137/533.11; 137/533.13
(58) Field of Search .............................. 137/526, 533.11, 137/533.13

(56) References Cited

U.S. PATENT DOCUMENTS

| | | | |
|---|---|---|---|
| 460,671 | * 10/1891 | Anthony | 137/526 |
| 3,778,024 | * 12/1973 | Rogerson | 137/533.11 |
| 3,863,671 | 2/1975 | Heimann . | |
| 4,142,645 | 3/1979 | Walton . | |
| 4,250,360 | 2/1981 | Svensson . | |
| 4,556,084 | * 12/1985 | Frawley | 137/526 |
| 4,806,082 | 2/1989 | Schenk . | |
| 4,991,623 | 2/1991 | Ericson . | |
| 5,033,504 | 7/1991 | Kallenbach . | |
| 5,105,848 | 4/1992 | Kallenbach . | |
| 5,419,366 | 5/1995 | Johnston . | |
| 5,441,679 | * 8/1995 | Chalich | 264/39 |
| 5,509,445 | * 4/1996 | Couet | 137/533.11 |
| 5,653,258 | * 8/1997 | Schwarz | 137/533.19 |

* cited by examiner

Primary Examiner—Michael Buiz
Assistant Examiner—Ramesh Krishnamurthy
(74) Attorney, Agent, or Firm—Siemens Patent Services LC

(57) ABSTRACT

A combined vacuum relief and pressure containing valve assembly for relieving vacuum developing within an associated vessel and for containing elevated pressures developing within the vessel. The valve assembly has a housing having two communicating passageways demarcated by a valve seat. The first passageway communicates to the open atmosphere and also with the valve from below the valve seat. The valve is a ball constrained to move only vertically above its seat. The second passageway communicates with the valve from above the valve seat. The second passageway extends below the valve so that when the valve assembly is connected to the associated vessel, pressures prevailing within the vessel act on the valve from above. Therefore, vacuum prevailing within the vessel, acting in concert with relatively higher ambient temperatures, will draw the valve into the open position. At zero pressure differential, gravity urges the valve into the closed position and maintains a seal. High pressures within the vessel further urge the valve into the closed position. The valve seat and the valve abut along a circular line of contact when the valve is in the closed position.

6 Claims, 2 Drawing Sheets

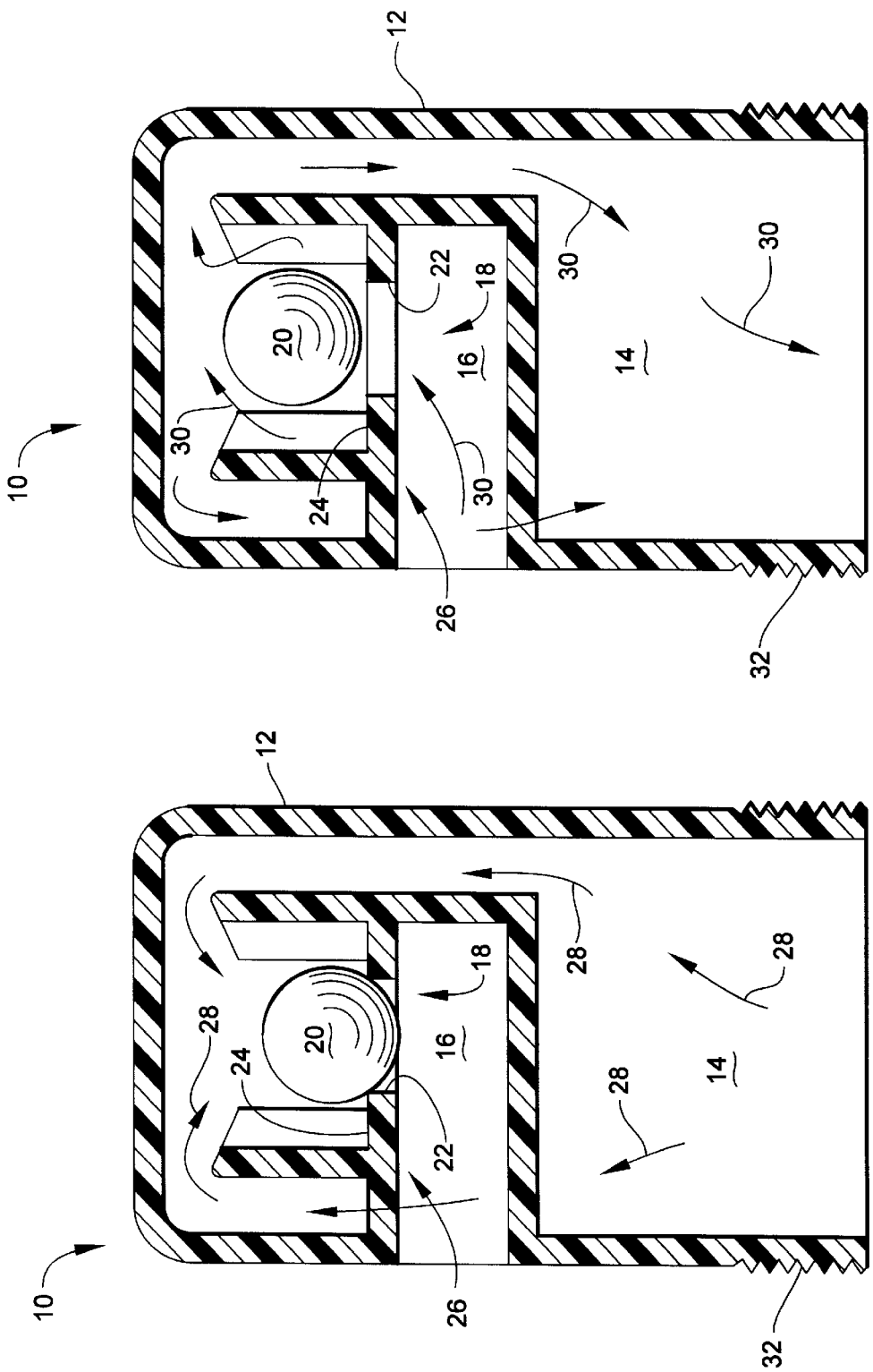

AIR VENT VALVE

BACKGROUND OF THE INVENTION

1. Field of the Invention

The present invention relates to air vent valves intended to relieve vacuum developed in conduits, while also serving as check valves preventing elevated pressures from propelling fluids past the valve. A principal application of the invention is for vacuum relief of domestic sewage piping systems in residential, commercial, industrial, and institutional buildings. Of course, any conduit system requiring the above aspiration scheme may utilize the invention.

2. Description of the Prior Art

Domestic sewage-piping systems usually have one or more conduits open to the atmosphere, for relieving vacuum conditions which would otherwise disrupt effective evacuation of wastewater. In most buildings, one or more such conduits extend through the roof and open above the building.

At different times, both vacuum and elevated pressures can exist within a sewage system. Vacuum, or pressures below ambient pressures, can prevent wastewater from being evacuated. High pressures, which could arise from decomposing organic materials, would not ordinarily interfere with evacuation of wastewater from the building, but can enable objectionable, malodorous gasses to enter occupied spaces if not conducted away therefrom. The open vent pipe ordinarily employed both relieves vacuum and also vents objectionable gasses from the building.

It would be possible to connect a unidirectional check valve to a domestic plumbing wastewater system in place of the permanently open conduit conventionally employed. Any valve which admits ambient air into the plumbing system while preventing noxious or objectionable vapors from entering occupied spaces would achieve the desired flow scheme, but is potentially subject to problems which can plague non-spherical valves. One problem is that non-spherical valves may be broad surfaces which can accumulate moisture and other substances which can cause the valve to stick to its seat. Light conditions of vacuum might then be unable to open the valve. Another problem is that if a non-spherical valve misaligns with its seat, it may potentially fail to seat properly. This could allow objectionable gasses to pass to occupied spaces.

The prior art has proposed valves for relieving vacuum while preventing discharge of gasses in the opposite direction. U.S. Pat. No. 3,863,671, issued to Bernard Heimann on Feb. 4, 1975, shows a valve for controlling vacuum wherein a counterweight and lever are connected to the valve. The present invention operates independently of and lacks any counterweight and lever.

U.S. Pat. No. 4,142,645, issued to Donald G. Walton on Mar. 6, 1979, describes a ball valve utilized for maintaining vacuum conditions in home canning operations. The ball vents ambient gasses from a receptacle responsive to connection to a source of suction. By contrast, the present invention is a self-contained assembly wherein the conduit to which it is connected provides both vacuum and also elevated pressures. The novel valve relieves vacuum prevailing in the conduit to which it is connected, while preventing elevated pressures therein from discharging fluids past the valve. The valve of Walton cannot relieve vacuum developed within the container associated with his valve.

U.S. Pat. No. 4,250,360, issued to Gustav E. Svensson on Feb. 10, 1981, shows a valve operated by tilting or acceleration of the valve housing. Tilting and acceleration cause the valve to overcome resistance of a spring biasing the valve in the closed position. By contrast, the present invention does not rely upon tilting or acceleration of the housing, and does not require a spring.

U.S. Pat. No. 4,806,082, issued to Jacob W. Schenk on Feb. 21, 1989, sets forth a valve assembly incorporating two valves each acted upon by its own spring. The present invention requires but one valve and requires no springs.

U.S. Pat. No. 4,991,623, issued to Kurt S. B. Ericson on Feb. 12, 1991, shows an automatic valve assembly wherein the valve is a disc. By contrast, the valve of the present invention is a rigid sphere or ball.

U.S. Pat. No. 5,033,504, issued to Dieter H. F. Kallenbach on Jul. 23, 1991, shows a relief valve which utilizes a flexible diaphragm. The present invention utilizes a ball as the valve, and does not have a flexible diaphragm.

U.S. Pat. No. 5,105,848, issued to Dieter H. F. Kallenbach on Apr. 21, 1992, sets forth an automatic relief valve which also utilizes a flexible diaphragm absent in the present invention. The present invention has a spherical valve which overcomes problems of non-spherical designs.

U.S. Pat. No. 5,419,366, issued to Ian F. Johnston on May 30, 1995, shows a valve assembly wherein the valve is an elastomeric diaphragm. By contrast, the valve of the present invention is spherical, which design avoids problems associated with non-spherical designs.

None of the above inventions and patents, taken either singly or in combination, is seen to describe the instant invention as claimed.

SUMMARY OF THE INVENTION

The present invention sets forth an uncomplicated valve suitable for relieving vacuum prevailing within a vessel, and which further prevents elevated external pressures from propelling fluids into the vessel. The novel valve has only one moving part, which is a ball or sphere, and requires no additional apparatus such as springs, counterweights, or any other apparatus connected to the valve to move, guide, or constrain the valve to achieve successful operation. Valve opening is responsive purely to relative pressure between the vessel to which the valve is connected and the open ambient atmosphere. Fluid flow is arranged so that maintaining the valve in the closed position utilizes gravity rather than requires overcoming gravity, while enabling the valve to open responsive to vacuum developed within the associated vessel.

Other advantages of the present invention assure appropriate valve sealing. Radial symmetry of the spherical shape of the valve provides ability to resist failure to seat due to misalignment of the valve and its valve seat. This promotes effective valve sealing. Another characteristic of the spherical shape, taken together with configuration of the valve seat, is that contact between the valve and its seat occurs along a circular line. This limited contact avoids a sticking effect which could occur due to accumulation of liquids and semi-solids. Such an occurrence could potentially cause the valve to adhere to the seat, thereby resisting opening responsive to conditions of light vacuum. The ball design assures that the valve will open responsive to low levels of vacuum prevailing in the pipe or vessel onto which the valve is installed.

The novel valve is highly suited to solving the problems of domestic sewer piping systems, wherein vacuum must be relieved while sewer system gasses must be prevented from entering occupied spaces. Incorporation of the novel valve eliminates the need for extensive piping, roof penetrations, and other disruptions to a structure associated with air vent pipes. The novel valve is free of complicating structure which could fail by clogging, wearing out, corroding, binding, going out of adjustment, or in any other similar way. It would be highly practical to connect one or more of the novel valves to a plumbing system as an alternative to providing an equal number of vent pipes.

The novel valve is readily formed from three parts, each one of which can be molded from inexpensive components such as plastic. The valve assembly has a housing formed in two parts which are assembled over the valve member, which is a ball. One end of the housing is threaded, so that the valve can be manually threaded to a threaded conduit of piping systems.

Accordingly, it is one object of the invention to provide a valve which both relieves vacuum developing within an associated vessel and also prevents fluids from escaping from the vessel due to relatively high pressures within the vessel.

It is another object of the invention to eliminate auxiliary apparatus which moves, guides, or constrains the valve.

It is a further object of the invention to eliminate need for extensive vent pipes from domestic sewer piping systems.

Still another object of the invention is to provide valve structure which overcomes problems of clogging, wearing out, corroding, binding, and going out of adjustment.

An additional object of the invention is that the valve respond only to pressures within the vessel which are either high or low relative to ambient atmospheric pressures.

Yet another object of the invention is to provide an uncomplicated valve assembly which can be readily and inexpensively fabricated from inexpensive materials.

Still another object of the invention is to be able to install the novel valve manually to a piping system.

Yet a further object of the invention is that the valve be urged into the closed position both by gravity and by pressure differentials.

An additional object of the invention is to overcome potential sticking of the valve in the closed position, and to prevent potential misalignment between the valve and its seat.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a side elevational, diagrammatic view of an embodiment of the invention, shown mostly in cross section, illustrating static conditions with the valve in the closed position.

FIG. 2 is a side elevational, diagrammatic view similar to FIG. 1, showing pressure and fluid flow conditions urging the valve into an open position.

DETAILED DESCRIPTION OF THE PREFERRED EMBODIMENTS

Figure 4:
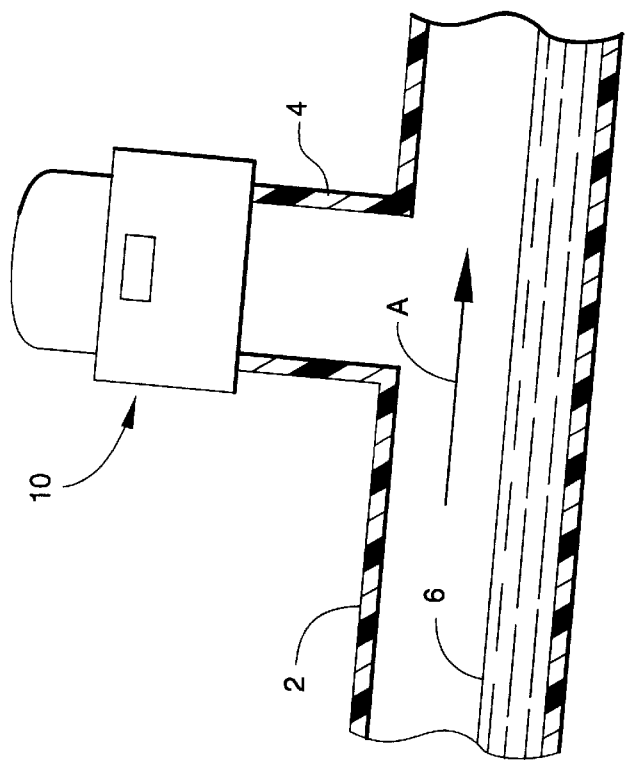
FIG. 4 is an environmental, side elevational view of one embodiment of the invention, shown mostly in cross section.

FIG. 1 of the drawings schematically shows the principle of operation of novel combined vacuum relief and pressure containing valve assembly 10. Valve assembly 10 relieves vacuum developing within an associated vessel (see FIG. 4), such as a pipe or tank, and contains elevated pressures developing within the vessel. Valve assembly 10 comprises a housing 12 having an internal passage divided into a first passageway 14 and a second passageway 16 which second passageway 16 communicates with passageway 14. A valve seat 18 formed in housing 12 demarcates first passageway 14 and second passageway 16.

A spherical valve 20 occupies first passageway 14. Housing 12 is configured to entrap valve 20 therewithin. Valve 20 is free floating within housing 12, being unencumbered by structure attached thereto. Valve seat 18 is dimensioned and configured to constrain valve 20 from entering second passageway 16. Valve seat 18 closes communication between first passageway 14 and second passageway 16 when valve 20 seats against valve seat 18. Valve seat 18 has a circular opening 22 bounded by an upright interior surface disposed at a perpendicular angle to upper surface 24 of wall 26 forming valve seat 18. As a consequence, valve seat 18 is configured to establish contact with valve 20 solely along a circular line.

Second passageway 16 communicates to the open atmosphere outside housing 12 and with valve 20 from below valve 20, with valve assembly 10 in the upright position depicted in FIG. 1. This upright position is that in which valve assembly 10 is operable and is installed to an associated vessel wherein interior vacuum is relieved. First passageway 14 is disposed to communicate with valve 20 from above valve 20. Passageway 14 extends and terminates below valve 20 when valve assembly 10 is in the upright position wherein valve 20 is located above valve seat 18.

FIG. 1 illustrates valve assembly 10 in the closed position, which position will occur whenever fluid pressure within passageway 16 does not exceed fluid pressure within passageway 14. This condition encompasses both equal pressures and also relatively higher pressure prevailing within passageway 14. High pressure is indicated representatively by arrows 28. Arrows 28 indicated the general direction in which fluid would flow if valve 20 were either open or absent, given relatively higher pressure in passageway 14.

FIG. 2 shows opening of valve 20, which occurs whenever pressure prevailing within passageway 16 exceeds that of passageway 14. Valve 20 is lifted from contact with valve seat 18. Fluid proceeds in the direction of arrows 30. It will be appreciated that first passageway 14 and second passageway 16 are dimensioned and configured to maintain valve 20 in an open position solely by relatively low pressures prevailing within first passageway 14 when relatively high pressures prevail within second passageway 16, and to maintain valve 20 in a closed position solely by gravity. The same configurations contribute to forces urging valve 20 into the closed position of FIG. 1 when relatively high pressures prevail within first passageway 14 and relatively low pressures prevail within second passageway 16.

Optionally, housing 12 has threads 32 capable of enabling valve assembly 10 to be threaded to a vessel having matingly compatible threads (not shown).

Figure 3:
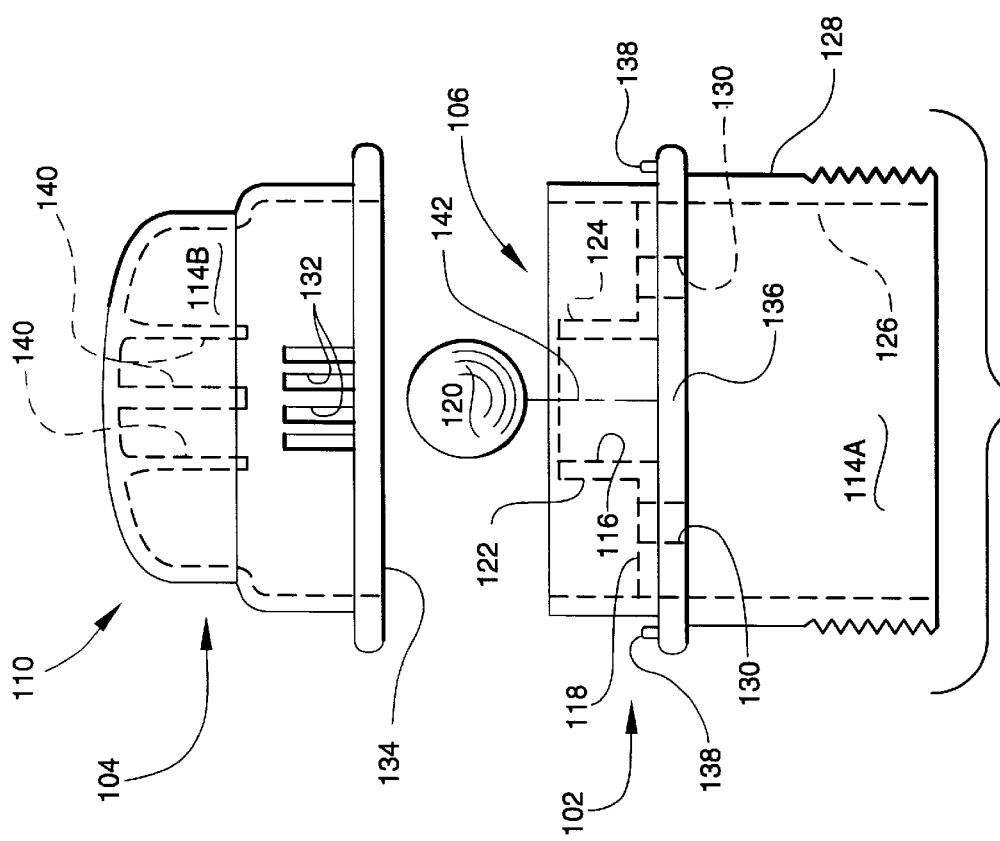
FIG. 3 is an exploded, side elevational view of a preferred embodiment of the invention.

Valve assembly 10 may be fabricated in any suitable way. For applications in domestic sewer systems, valve assembly 10 may be molded from a plastic material such as polyvinyl chloride. Housing 12 is preferably formed in two separate pieces which are united after valve 20 is placed over valve seat 18. This is shown in FIG. 3, to which attention is now directed.

In the preferred embodiment, valve assembly 110 is formed in three parts, including a base 102, a cap 104, and ball valve 120. Base 102 incorporates a valve seat 106. Air passage 116 is formed between walls 122, 124 of base 102. In the embodiment of FIG. 3, air passage 116 extends to the side walls of base 102. Air passage 116 is closed at the bottom by a floor panel 118 which extends to the inner circumferential surface 126 of circumferential wall 128 of base 102. Floor panel 118 is solid except for air passages 130 which enable fluid communication between passageway 114A of base 102 and passageway 114B of cap 104 when cap 104 is installed on base 102.

Cap 104 has lateral breather openings 132 which open air passage 116 to the open atmosphere when cap 104 is installed on base 102. Cap 104 is lowered over base 102 when being installed until flange 134 of cap 104 abuts flange 136 of base 102. Upwardly projecting pins 138 are received in cooperating openings (not shown) formed in cap 104 to assure operable alignment of breather openings 132 with air passage 116 during installation. Downwardly projecting prongs 140 collectively form a cage constraining ball valve to move only vertically above valve seat 106 when valve assembly 10 is in the vertical orientation shown in FIG. 3. This function is performed by fins projecting upwardly from wall 26 in the embodiment of FIG. 1. Vertical orientation of valve assembly signifies that axis 142 of valve seat 106 is vertically oriented. Ball valve 120 is thus constrained against moving within passageway 114B to a position from which it cannot seat.

Cap 104 may be detachably fixed to base 102 by friction fit if desired. Alternatively, cap 104 may be glued or welded to base 102.

FIG. 4 shows a representative application of the invention. Valve assembly 10 is mounted on a vertical extension 4 of a pipe 2. Pipe 2 contains water 8 flowing in the direction of arrow A. Flow induces a vacuum to develop in pipe 2. Valve assembly 10 relieves this vacuum by admitting air from the atmosphere outside pipe 2. Because valve assembly 10 prevents objectionable gasses from passing from inside pipe 2 to the atmosphere around pipe 2, it is feasible to locate valve assembly 10 at any convenient point inside a residence or other building served thereby. The conventional vent pipe typically penetrating the roof is eliminated.

It is to be understood that the present invention is not limited to the embodiments described above, but encompasses any and all embodiments within the scope of the following claims.

What is claimed is:

1. A combined vacuum relief and pressure containing valve assembly for relieving vacuum developing within an associated vessel and for containing elevated pressures developing within the vessel, comprising:

a housing having an internal passage divided into a first passageway and a second passageway which communicates with said first passageway, and a valve seat demarcating said first passageway and said second passageway;

a spherical valve disposed to occupy said first passageway, wherein said valve is entrapped within said housing, and wherein said valve seat is dimensioned and configured to constrain said valve from entering said second passageway and to close communication between said first passageway and said second passageway when said valve seats against said valve seat, wherein said second passageway communicates to said valve from below said valve and also to ambient atmosphere, and said first passageway is disposed to communicate with said valve from above said valve and to extend and terminate below said valve when said valve assembly is in a position wherein said valve is located above said valve seat, wherein said housing is formed in two mating parts including a base containing said valve seat and a cap incorporating a cage constraining said valve to move only vertically relative to said valve seat when said valve assembly is vertically oriented, said second passageway is formed in said base, and said first passageway passes through both said base and said cap.

2. The valve assembly according to claim 1, wherein said first passageway and said second passageway are dimensioned and configured to maintain said valve in an open position solely by relatively low pressures prevailing within said first passageway when relatively high pressures prevail within said second passageway, and to maintain said valve in a closed position solely by gravity.

3. The valve assembly according to claim 2, wherein said first passageway is configured to contribute to forces urging said valve into said closed position when relatively high pressures prevail within said first passageway and relatively low pressures prevail within said second passageway.

4. The valve assembly according to claim 1, wherein said housing has threads capable of enabling said valve assembly to be threaded to a vessel having matingly compatible threads.

5. The valve assembly according to claim 1, wherein said valve seat is configured to establish contact with said valve solely along a circular line.

6. A combined vacuum relief and pressure containing valve assembly for relieving vacuum developing within an associated vessel and for containing elevated pressures developing within the vessel, comprising:

a housing having an internal passage divided into a first passageway and a second passageway which communicates with said first passageway, and a valve seat demarcating said first passageway and said second passageway;

a valve disposed to occupy said first passageway, wherein said valve is entrapped within said housing, and wherein said valve seat is dimensioned and configured to constrain said valve from entering said second passageway and to close communication between said first passageway and said second passageway when said valve seats against said valve seat, wherein said second passageway communicates to said valve from below said valve and also to ambient atmosphere, and said first passageway is disposed to communicate with said valve from above said valve and to extend and terminate below said valve when said valve assembly is in a position wherein said valve is located above said valve seat, wherein said housing is formed in two mating parts including a base containing said valve seat and a cap incorporating a cage constraining said valve to move only substantially vertically relative to said valve seat when said valve assembly is vertically oriented, said second passageway is formed in said base, and said first passageway passes through both said base and said cap.

* * * * *